(12) United States Patent
Chen

(10) Patent No.: US 11,044,514 B2
(45) Date of Patent: Jun. 22, 2021

(54) METHOD FOR DISPLAYING BULLET COMMENT INFORMATION, METHOD FOR PROVIDING BULLET COMMENT INFORMATION, AND DEVICE

(71) Applicant: Tencent Technology (Shenzhen) Company Limited, Shenzhen (CN)

(72) Inventor: Yuan Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/823,000

(22) Filed: Mar. 18, 2020

(65) Prior Publication Data
US 2020/0260137 A1     Aug. 13, 2020

Related U.S. Application Data

(63) Continuation of application No. PCT/CN2018/106296, filed on Sep. 18, 2018.

(30) Foreign Application Priority Data

Sep. 28, 2017   (CN) .......................... 201710894644.3

(51) Int. Cl.
*H04N 21/431* (2011.01)
*G06K 9/00* (2006.01)
(Continued)

(52) U.S. Cl.
CPC ..... *H04N 21/4312* (2013.01); *G06K 9/00711* (2013.01); *H04N 21/4788* (2013.01);
(Continued)

(58) Field of Classification Search
CPC ......... H04N 21/4312; H04N 21/47217; H04N 21/4788; H04N 21/8586; H04N 21/8133;
(Continued)

(56) References Cited

U.S. PATENT DOCUMENTS 9,380,325 B1 *  6/2016  Cormie .................. H04N 21/20
9,854,314 B1 * 12/2017  Wittke ............... H04N 21/4722
(Continued)

FOREIGN PATENT DOCUMENTS

CN      103533442 A    1/2014
CN      104636434 A    5/2015
(Continued)

OTHER PUBLICATIONS

Machine translation for CN 106303746A retrieved from Google Patents Jan. 28, 2021.*

(Continued)

*Primary Examiner* — Fernando Alcon
(74) *Attorney, Agent, or Firm* — Morgan, Lewis & Bockius LLP

(57) ABSTRACT

Embodiments of the present disclosure disclose a method for displaying bullet comment information performed at a terminal. The method includes: obtaining a bullet comment service instruction configured for obtaining a bullet comment function provided by a bullet comment information server; obtaining multimedia information of a multimedia resource currently played by a second client; transmitting a bullet comment obtaining request to the bullet comment information server, the bullet comment obtaining request carrying the multimedia information; and receiving bullet comment information returned based on the multimedia information by the bullet comment information server, and displaying the bullet comment information on a playback interface of the second client. Embodiments of the present disclosure provide a manner of providing a bullet comment information service, so that a client without a bullet comment information service can use a bullet comment information service in a function extension manner without a need to build a related service.

18 Claims, 9 Drawing Sheets

(51) Int. Cl.
*H04N 21/472* (2011.01)
*H04N 21/4788* (2011.01)
*H04N 21/858* (2011.01)

(52) U.S. Cl.
CPC ... *H04N 21/47217* (2013.01); *H04N 21/8586* (2013.01); *G06K 2209/01* (2013.01)

(58) Field of Classification Search
CPC ............ H04N 21/237; H04N 21/2393; H04N 21/43615; H04N 21/4122; H04N 21/25816; H04N 21/4316; H04N 21/4882; H04N 21/4884; H04N 21/254; H04N 21/431; H04N 21/858; G06K 9/00711; G06K 2209/01
See application file for complete search history.

(56) References Cited

U.S. PATENT DOCUMENTS

| | | | | |
|---|---|---|---|---|
| 2001/0001160 | A1* | 5/2001 | Shoff | H04N 5/44543 725/51 |
| 2006/0195859 | A1* | 8/2006 | Konig | H04N 21/44008 725/19 |
| 2009/0106801 | A1* | 4/2009 | Horii | H04N 21/43615 725/91 |
| 2013/0094590 | A1* | 4/2013 | Laksono | G06F 16/7867 375/240.25 |
| 2013/0205321 | A1* | 8/2013 | Sinha | H04N 21/4147 725/19 |
| 2013/0246457 | A1* | 9/2013 | Stojancic | G06F 16/434 707/769 |
| 2014/0007155 | A1* | 1/2014 | Vemparala | H04N 21/2668 725/32 |
| 2014/0082655 | A1* | 3/2014 | Moon | H04N 21/4622 725/27 |
| 2014/0089815 | A1 | 3/2014 | Gildfind et al. | |
| 2014/0115622 | A1 | 4/2014 | Zhang et al. | |
| 2014/0196082 | A1* | 7/2014 | Maruyama | G11B 27/034 725/32 |
| 2015/0020094 | A1* | 1/2015 | Moon | H04N 21/4828 725/32 |
| 2015/0110470 | A1 | 4/2015 | Zhang et al. | |
| 2016/0088341 | A1* | 3/2016 | Yabu | H04N 21/4884 725/32 |
| 2016/0261927 | A1* | 9/2016 | Smolic | H04N 21/4722 |
| 2017/0118538 | A1* | 4/2017 | Ashbacher | G06F 16/783 |
| 2017/0171601 | A1 | 6/2017 | Cui | |
| 2017/0251240 | A1* | 8/2017 | Peng | H04N 21/8153 |
| 2018/0267970 | A1 | 9/2018 | Zhang | |
| 2018/0357487 | A1* | 12/2018 | Badr | G06K 9/00751 |
| 2019/0394419 | A1* | 12/2019 | Zhang | H04N 21/44008 |

FOREIGN PATENT DOCUMENTS

| | | |
|---|---|---|
| CN | 104980809 A | 10/2015 |
| CN | 104994401 A | 10/2015 |
| CN | 105992021 A | 10/2016 |
| CN | 106101747 A | 11/2016 |
| CN | 106303634 A | 1/2017 |
| CN | 106303746 A | 1/2017 |
| CN | 106792188 A | 5/2017 |
| CN | 107690078 A | 2/2018 |

OTHER PUBLICATIONS

Tencent Technology, ISRWO, PCT/CN2018/106296, Nov. 28, 2018, 8 pages.
Tencent Technology, IPRP, PCT/CN2018/106296, Mar. 31, 2020, 6 pages.
Boreum Choi et al., "The Effects of Second-Screen Viewing and the Goal Congruency of Supplementary Content on User Perceptions," Computers in Human Behavior, Pergamon, New York, NY, US, vol. 64, Jul. 17, 2016, pp. 347-354, ISSN: 0747-5632.
Extended European Search Report, EP18862536.2, dated Dec. 9, 2020, 14 pgs.

* cited by examiner

METHOD FOR DISPLAYING BULLET COMMENT INFORMATION, METHOD FOR PROVIDING BULLET COMMENT INFORMATION, AND DEVICE

CROSS-REFERENCE TO RELATED APPLICATIONS

This application is a continuation application of PCT/CN2018/106296, entitled "METHOD FOR DISPLAYING BULLET COMMENT INFORMATION, METHOD FOR PROVIDING BULLET COMMENT INFORMATION, AND DEVICE" filed on Sep. 18, 2018, which claims priority to Chinese Patent Application No. 201710894644.3, entitled "METHOD FOR DISPLAYING BULLET COMMENT INFORMATION, METHOD FOR PROVIDING BULLET COMMENT INFORMATION, AND DEVICE" filed on Sep. 28, 2017, all of which are incorporated by reference in their entirety.

FIELD OF THE TECHNOLOGY

The present disclosure relates to the field of network technologies, and in particular, to a method for displaying bullet comment information, a method for providing bullet comment information, and a device.

BACKGROUND OF THE DISCLOSURE

A video platform is a platform providing online videos for users to watch. To provide more interactive and fun video watching, many video platforms provide a vivid and intuitive information display manner. In this manner, information is displayed in the form of a flying bullet on a screen. Therefore, the information displayed in this manner is also referred to as a video bullet comment. By means of such a video bullet comment function, a viewer may watch video bullet comments posted by other video viewers, or may send a video bullet comment during video watching, so that the content of the sent bullet comment can be watched by other viewers.

A video platform or an application client that has not implemented a video bullet comment function needs to build from scratch services related to a video bullet comments to implement a video bullet comment function. The process not only incurs high development costs but also affects a launch schedule.

SUMMARY

Embodiments of the present disclosure provide a method for displaying bullet comment information, a method for providing bullet comment information, and a device, to resolve the problems of high development costs and an affected launch schedule. The technical solutions are as follows.

According to a first aspect, a method for displaying bullet comment information performed at a terminal having one or more processors and memory storing a plurality of programs to be executed by the one or more processors, and the method comprising:

receiving a multimedia resource from a multimedia resource server and playing the multimedia resource using a second client running at the terminal;

obtaining, via a first client running at the terminal, a bullet comment service instruction from a user of the terminal, the bullet comment service instruction being configured for obtaining a bullet comment function in connection with the multimedia resource currently played by the second client;

in response to the bullet comment service instruction:

obtaining multimedia information of the multimedia resource currently played by the second client;

transmitting a bullet comment obtaining request to a bullet comment information server, the bullet comment obtaining request carrying the multimedia information;

receiving bullet comment information returned by the bullet comment information server based on the multimedia information; and overlaying the bullet comment information on a playback interface of the second client on which the multimedia resource is being played.

According to a second aspect, a terminal comprises one or more processors, memory coupled to the one or more processors and a plurality of programs stored in the memory that, when executed by the one or more processors, cause the terminal to perform the aforementioned method for displaying bullet comment information.

According to a third aspect, a non-transitory computer readable storage medium stores a plurality of machine readable instructions in connection with a terminal having one or more processors. The plurality of machine readable instructions, when executed by the one or more processors, cause the terminal to perform the aforementioned method for displaying bullet comment information.

In a possible implementation, an obtaining manner of the multimedia information includes:

extracting, by a second client, the multimedia information from a currently accessed Uniform Resource Locator (URL); or extracting, by a second client, the multimedia information from stored multimedia resource data; or performing, by a second client, character recognition in a target area of a playback interface, to obtain the multimedia information.

A possible obtaining manner includes: traversing, by the second client, stored multimedia resource data, and extracting data corresponding to a target label as the multimedia information in a case that the target label is reached.

In a possible implementation, the displaying, by the terminal, the bullet comment information on a playback interface of the currently played multimedia resource includes: determining, by the second client, the playback interface of the currently played multimedia resource on the display interface of the second client, and displaying the bullet comment information at a target position of the playback interface.

In a possible implementation, after the obtaining a bullet comment service instruction, a second client may display a bullet comment function login interface; user information obtained based on the bullet comment function login interface is transmitted to the bullet comment information server; and after the bullet comment information server is verified, the operation of obtaining multimedia information of a multimedia resource currently played by a second client is performed.

In a possible implementation, a second client may provide a bullet comment display setting box, and set a bullet comment display manner according to display parameters obtained based on the bullet comment display setting box.

In a possible implementation, the bullet comment information at least includes bullet comment content, and further includes one or a combination of several of a user unique identifier of a bullet comment sender, a bullet comment sending time, and bullet comment interaction information.

In a possible implementation, the multimedia information obtaining module is configured to:

extract the multimedia information from a URL currently accessed by the second client; or extract the multimedia information from multimedia resource data that is already stored on the second client; or perform character recognition in a target area of the playback interface of the second client to obtain the multimedia information.

In a possible implementation, the multimedia information obtaining module is configured to: traverse multimedia resource data that is already stored on the second client, and extract data corresponding to a target label as the multimedia information in a case that the target label is reached.

In a possible implementation, the display module is configured to: determine a playback interface of the currently played multimedia resource on the display interface of the second client, and display the bullet comment information at a target position of the playback interface.

In a possible implementation, the display module is further configured to display a bullet comment function login interface:

the transmission module is further configured to transmit user information obtained based on the bullet comment function login interface to the bullet comment information server; and the multimedia information obtaining module is configured to: after the bullet comment information server is verified, perform the operation of obtaining multimedia information of a multimedia resource currently played by a second client.

In a possible implementation, the apparatus further includes:

a setting module, configured to: provide a bullet comment display setting box, and set a bullet comment display manner according to display parameters obtained based on the bullet comment display setting box.

In a possible implementation, the first client and the second client are different clients, or, the first client is a plug-in of the second client.

In a possible implementation, the bullet comment information at least includes bullet comment content, and further includes one or a combination of several of a user unique identifier of a bullet comment sender, a bullet comment sending time, and bullet comment interaction information.

In a possible implementation, the receiving module is further configured to receive user information;

the apparatus further includes: a verification module, configured to verify the user information; and the transmission module is further configured to: after the verification succeeds, transmit a login token to the terminal, where the login token is configured for indicating that the terminal is in a logged-in state.

In a possible implementation, the receiving module is further configured to receive a bullet comment addition request, where the bullet comment addition request carries new bullet comment information and the multimedia information:

the conversion module is further configured to convert the multimedia information to obtain multimedia identification information of the multimedia information; and the apparatus further includes: a first storage module, configured to correspondingly store the new bullet comment information and the multimedia identification information of the multimedia information.

In a possible implementation, the bullet comment addition request further carries user information of a bullet comment sender;

the conversion module is further configured to convert the user information of the bullet comment sender to obtain a user unique identifier, and the apparatus further includes:

a second storage module, configured to correspondingly store the user unique identifier, the new bullet comment information, and the multimedia identification information of the multimedia information.

In a possible implementation, the receiving module is further configured to receive a bullet comment interaction request, where the bullet comment interaction request carries a bullet comment identifier and the bullet comment interaction information; and the apparatus further includes:

a third storage module, configured to correspondingly store the bullet comment interaction information and the bullet comment identifier.

The embodiments of the present disclosure provide a manner of providing a bullet comment information service, so that a client without a bullet comment information service can use a bullet comment information service in a function extension manner without a need to build a related service, thereby avoiding high development costs and meeting a launch schedule.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the implementations of the present disclosure in detail with reference to the accompanying drawings.

Figure 1:
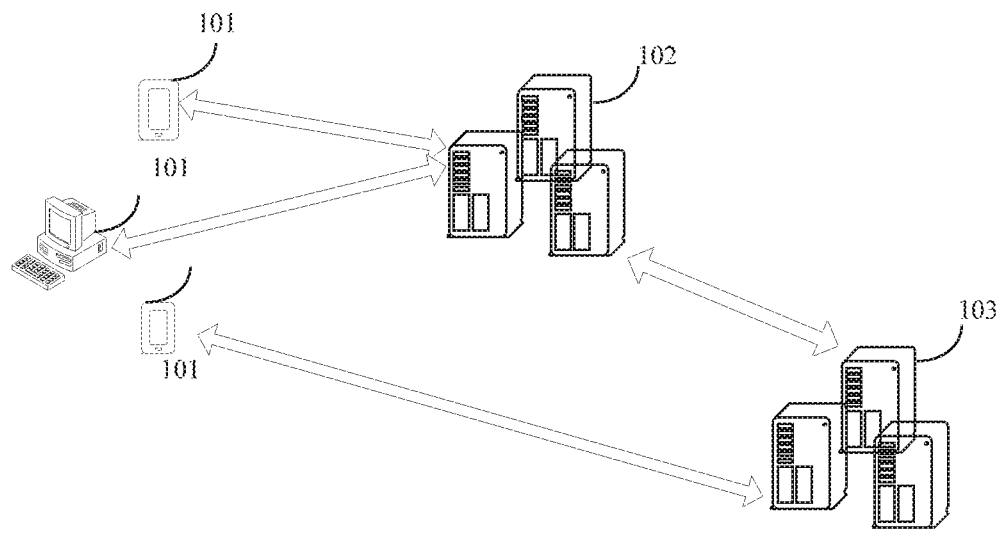
FIG. 1 is a schematic diagram of an implementation environment for a method for displaying bullet comment information according to an embodiment of the present disclosure.

FIG. 1 is a schematic diagram of an implementation environment for a method for displaying bullet comment information according to an embodiment of the present disclosure. The implementation environment includes at least one terminal 101, a multimedia resource server 102, and a bullet comment information server 103.

The at least one terminal 101 may be installed with a first client and a second client. The first client is served by the bullet comment information server 103. The second client may include multimedia resource clients such as a browser client, an audio application client, and a video application client. The audio application client and the video application client may both be clients served by a multimedia resource server 102 or may be players that can provide a playback service without Internet connection. This type of clients may be configured to play a multimedia resource stored in a storage space on a terminal or may be players that have an independent playback function and can use a multimedia resource service provided by the multimedia resource server 102. This is not specifically limited in this embodiment of the present disclosure.

The first client may establish a connection with the bullet comment information server 103 and data is exchanged through the connection, to obtain bullet comment information provided by the bullet comment information server 103 and send bullet comment information or the like to the bullet comment information server 103.

A user of the terminal 101 may access the multimedia resource server 102 by using the second client, to use a multimedia service provided by the multimedia resource server 102. For example, the terminal 101 may access the multimedia resource server 102 by using the video application client or may access a portal site of the multimedia resource server 102 by using the browser client.

The multimedia resource server 102 is configured to provide a multimedia service. The multimedia service may be a video service, an audio service, a picture service, a reading service, a question-and-answer service or the like. For example, the multimedia resource server 102 is a video server. Video services provided by the multimedia resource server 102 may include services such as video on demand, online video playback, and video downloading. In addition, the multimedia resource server 102 may provide more than one single service. For example, the video server may further provide other types of multimedia services such as an audio service in addition to video services. An audio server may further provide more types of multimedia services such as a video service in addition to an audio service. Certainly, the multimedia resource server may further provide a forwarding function, a commenting function or the like. This is not specifically limited in this embodiment of the present disclosure. The online video playback service may be operations such as converting a film into a video data stream and using a video application client or a portal site to provide the video data stream to the terminal 101 for online playback or off-line downloading.

The multimedia resource server 102 may exchange data with the bullet comment information server 103 in a manner such as an API or SDK, to help provide the second client with obtained bullet comment information for presentation. Certainly, the multimedia resource server 102 may further transmit bullet comment information transmitted by the second client to the bullet comment information server 103. The API is an agreement for interfacing different components in a software system. The SDK is generally a set of some development kits used by a software engineer to create application software for a specific software package, software framework, hardware platform, operating system, and the like.

Figure 2:
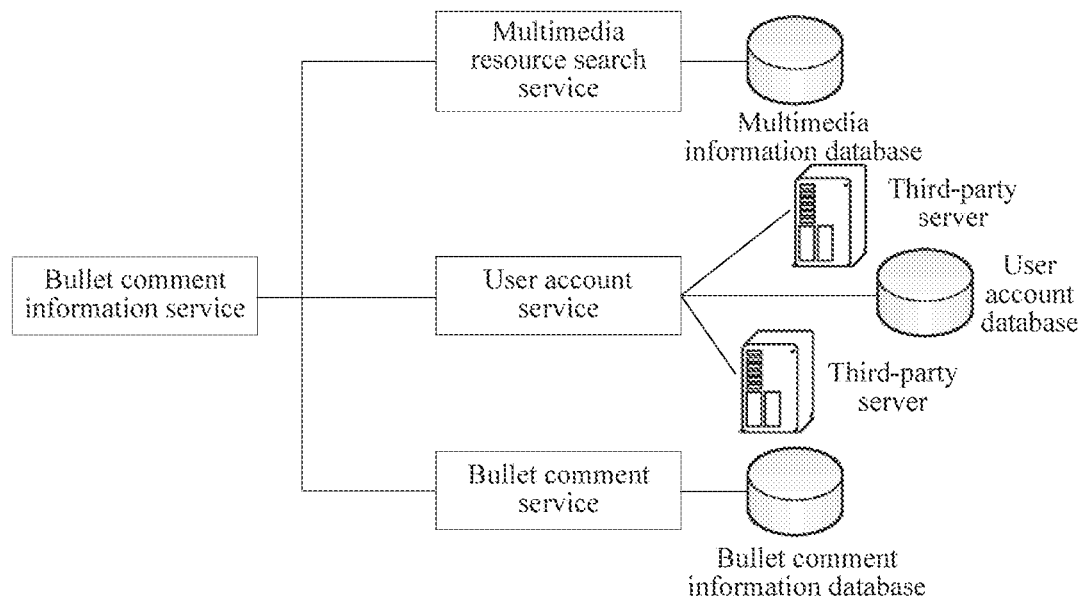
FIG. 2 is a schematic diagram of an implementation environment for a method for displaying bullet comment information according to an embodiment of the present disclosure.

Referring to FIG. 2, the bullet comment information server 103 is configured to provide a bullet comment information service. The bullet comment information service may include a multimedia resource search service, a user account service, and a bullet comment service.

The multimedia resource search service may be used in combination with the bullet comment service. That is, multimedia information is converted, so that a multimedia resource can correspond to bullet comment information in the bullet comment service, and a multimedia information database is provided. The multimedia information database may be configured to store information required for the conversion, for example, a correspondence between a conversion rule and multimedia information, to convert multimedia information, thereby helping provide accurate bullet comment information services to different platforms or clients. Certainly, the multimedia information database may further store description information such as multimedia playback duration of a multimedia resource.

The user account service may be that the bullet comment information server 103 has an account mechanism. That is, a user may register with the bullet comment information server 103 by using a first client, to obtain user information, subsequently log on based on the user information, and obtain the bullet comment service provided by the bullet comment information server 103. Specifically, the bullet comment information server 103 may provide a user account database, and user information obtained after the registration may all be stored in the user account database. The bullet comment information server 103 may further provide a login mechanism for a third-party account, for example, a login mechanism based on various social application accounts. That is, the bullet comment information server 103 may convert user information in an account mechanism of a third-party server based on the mechanism, to obtain a user unique identifier to achieve privacy protection for the user.

The bullet comment service is that the bullet comment information server 103 may collect bullet comment information and provide a second client with the bullet comment information by using the multimedia resource server 102 or directly provide the first client with the bullet comment information. Specifically, the bullet comment information server 103 may serve a plurality of multimedia resource servers 102, collect and store bullet comment information transmitted by users on different clients of different platforms, and provide the terminal 101 with the collected bullet comment information for display, thereby extending functions of the multimedia resource servers 102. For example, the bullet comment information server 103 may store the foregoing bullet comment information in a bullet comment information database. The bullet comment information may include at least bullet comment content, and further includes one or a combination of several of a user unique identifier of a bullet comment sender, a bullet comment sending time, and bullet comment interaction information. The user unique identifier may be an identifier that is supported by the bullet comment information server 103 and configured for uniquely identifying a bullet comment sender. The bullet comment sending time may be a time point at which the user actually posts the bullet comment content or may be a time point at which the bullet comment content is displayed in a multimedia resource. This is not specifically limited in this embodiment of the present disclosure. The bullet comment interaction information may be comment information, like information, dislike information, tipping information, gift sending information, and the like from another user for the bullet comment content. In addition, the bullet comment information may have a bullet comment identifier configured for uniquely identifying the bullet comment information. The at least one terminal 101 and the multimedia resource server 102 may use different information to identify one multimedia resource. Therefore, the bullet comment information server 103 may allocate one piece of multimedia identification information to the multimedia resource. The multimedia identification information may be information configured for uniquely identifying the multimedia resource. The multimedia identification information on the bullet comment information server 103 may be different from or the same as information configured for identifying the multimedia resource on the terminal 101 or the multimedia resource server 102. In this way, for one multimedia resource, the bullet comment information server 103 may unify information configured for identifying the multimedia resource. One multimedia resource may correspond to a plurality of pieces of bullet comment information, so that one piece of multimedia identification information may correspond to a plurality of bullet comment identifiers. Each bullet comment identifier corresponds to one piece of bullet comment information. The bullet comment information may include, for example, the foregoing specific content of the bullet comment information.

The bullet comment information server 103 may be a single server or a server cluster including a plurality of servers. The services may be implemented by the same server or may be implemented by different servers in the server cluster. This is not specifically limited in this embodiment of the present disclosure.

Figure 3:
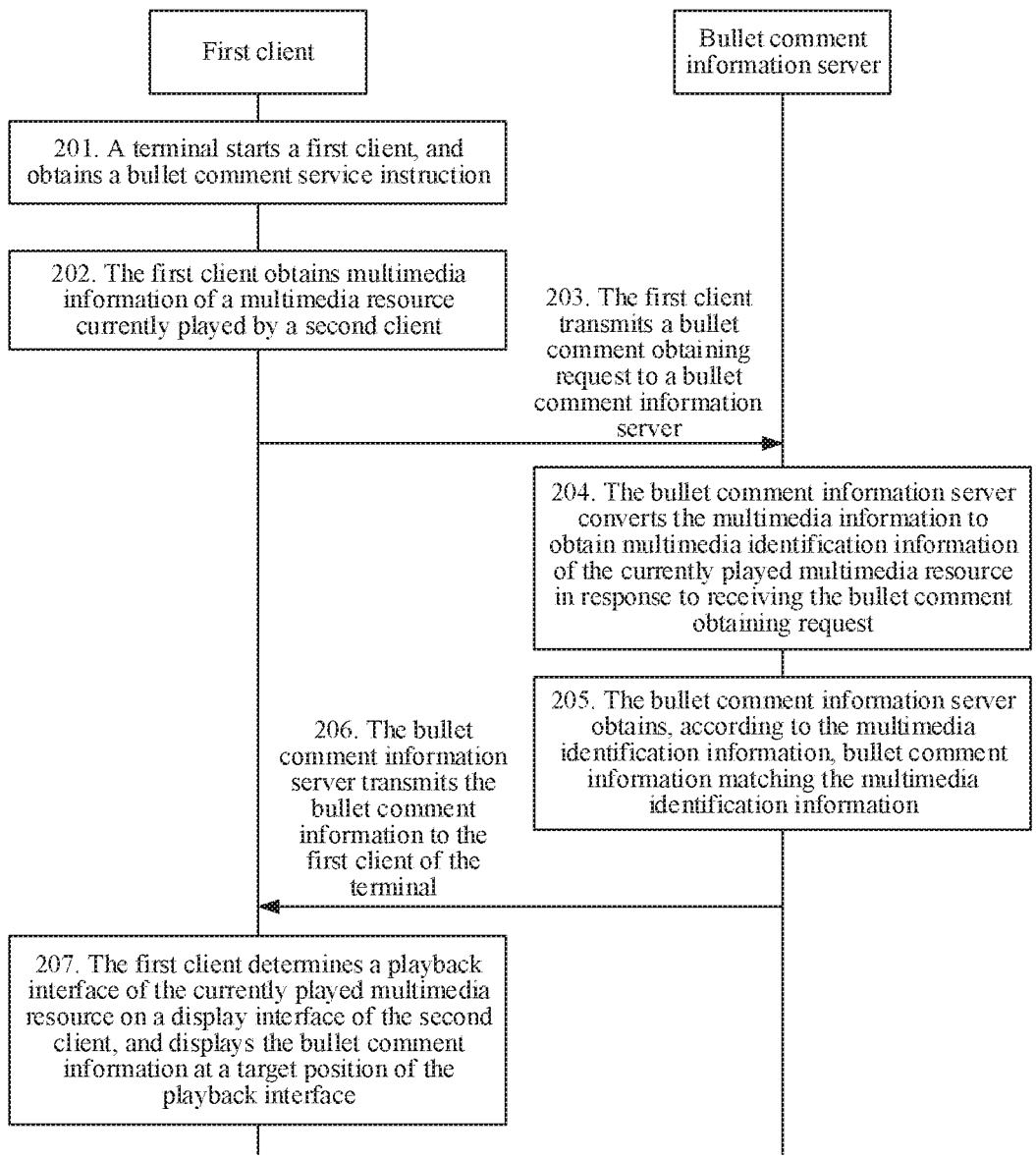
FIG. 3 is a flowchart of a method for displaying bullet comment information according to an embodiment of the present disclosure.

FIG. 3 is a flowchart of a method for displaying bullet comment information according to an embodiment of the present disclosure. The method may be implemented based on the implementation environment in FIG. 1. An example in which a first client provides a second client with a bullet comment information service by using a bullet comment information server is used for description. Referring to FIG. 3, the method includes the following steps:

201. A terminal starts the first client, and obtains a bullet comment service instruction, the first client being configured to provide a bullet comment information service, and the bullet comment service instruction being configured for obtaining a bullet comment function provided by the bullet comment information server.

The terminal used in this embodiment of the present disclosure may be a terminal installed with the first client and the second client. The first client may be an independent client or may be used as a plug-in of the second client, and is served by the bullet comment information server. Correspondingly, based on the foregoing different implementation forms, the first client may be specifically started in the following manners:

(1). The first client and the second client are different clients.

The first client may be associated with the second client, and automatically starts in a case that the second client is started. Certainly, the first client may also be started based on a starting operation of a user. For example, in a case that the user starts a video application client, a bullet comment information client may be started to provide a bullet comment information service to the video application client. Certainly, the bullet comment information client may also be started before the video application client is started. A specific order of starting the first client and the second client is not limited in this embodiment of the present disclosure.

(2). The first client is a plug-in of the second client.

A plug-in (plugin), also referred to as an add-in (addin), an add-on (addon) or an extension, is a computer program. The Plug-in interacts with an application program (for example, a web page browser or an email client) to add some specific functions to the application program. The plug-in may be regarded as a function extension. In a case that the second client installed with the plug-in is started, the first client may start to provide the bullet comment information service. Certainly, the plug-in may be not run first during the running of the second client. Instead, the plug-in is started based on that the user starts a plug-in function.

Based on any one of the foregoing implementation forms, the bullet comment service instruction may be automatically triggered in a case that the first client is started or may be triggered by a manual operation on the first client by the user. This is not specifically limited in this embodiment of the present disclosure.

Certainly, in any one of the implementation forms of the first client, the first client may provide a bullet comment display setting box, and set a bullet comment display manner according to display parameters obtained based on the bullet comment display setting box. A user of the terminal may set a bullet comment information display manner such as a display font, a display area, and a dynamic display effect according to the user's preferences.

Optionally, the first client may further provide a user of the terminal with an input box for bullet comment information, so that the user of the terminal may input bullet comment information into the input box. After determining that a bullet comment is sent, bullet comment information obtained based on the input box is transmitted to the bullet comment information server.

The bullet comment information server may also provide bullet comment information based on the user. On one hand, some targeted personal services such as bullet comment history search may be provided. On the other hand, higher requirements may be imposed on the posting of bullet comments to prevent users from posting junk information. A specific account mechanism of the bullet comment information server is the same as that in the description of the bullet comment information server. Details are not described herein again. To provide the bullet comment information based on the user, after obtaining the bullet comment service instruction, the first client may perform the following process: displaying a bullet comment function login interface; transmitting user information obtained based on the bullet comment function login interface to the bullet comment information server; and after the bullet comment information server is verified, performing an operation of obtaining multimedia information of a multimedia resource currently played by the second client. In response to receiving the user information, the server may verify the user information, and transmit a login token to the first client in a case that the verification succeeds. In response to receiving the login token transmitted by the bullet comment information server, every time the first client transmits any information to the bullet comment information server subsequently, the information carries the login token, to indicate that the first client is in a logged-in state.

202. The first client obtains multimedia information of a multimedia resource currently played by the second client.

In a case that the second client is currently playing the multimedia resource, in response to receiving the bullet comment service instruction, the first client may obtain the multimedia information in any one of the following manners:

In a first implementation, the first client extracts the multimedia information from a URL currently accessed by the second client.

For the second client, in a case that a multimedia resource is played in the form of accessing a web page, for example, accessing a video website, playing a video link or playing an audio link, because a general resource website includes multimedia information in the URL of the resource website, a character string of a target position in the URL may be extracted, and the extracted character string is used as the multimedia information.

In a second implementation, the first client may extract the multimedia information from multimedia resource data that is already stored on the second client.

The second client may store multimedia resource data of a multimedia resource during playback, and the multimedia resource data may include multimedia information. Therefore, the multimedia information may be extracted by using the multimedia resource data. For example, the first client may traverse multimedia resource data downloaded by the second client, and extract data corresponding to a target label as the multimedia information in a case that the target label is reached. The target label may be configured for indicating the multimedia information, for example, a name or number of the multimedia resource. Certainly, the multimedia information may be extracted from the header of a data packet of the multimedia resource data or a target field of the data packet. Certainly, in a case that the multimedia resource played by the second client is a multimedia resource that is already stored in a local storage space on the terminal, the multimedia information may be extracted from attribute information or description information of a multimedia resource file.

For example, the second client is a video application client. Generally, the video application client may obtain a plurality of data packets. The packet header of a data packet may include multimedia information. For example, the second client is a browser client. Generally, in a case that the browser client opens a playback interface, a target label may be used to identify multimedia information in source code of the playback interface of the browser client. Therefore, the first client may obtain the multimedia information of the currently played multimedia resource of the second client in the foregoing extraction manners.

In a third implementation, the first client performs character recognition in a target area of a playback interface of the second client to obtain the multimedia information.

The second client generally displays the multimedia information of the currently played multimedia resource in the target area. For example, the target area may be an upper left corner of the second client, and characters of the multimedia information are relatively large to provide a more obvious visual effect. Therefore, a character recognition technology may be used in the target area to obtain the multimedia information.

First, in a case that the first client obtains the multimedia information, one of the foregoing implementations that is to be specifically used is not limited in this embodiment of the present disclosure. Certainly, to provide more accurate multimedia information, the first client may separately obtain multimedia information based on at least two of the foregoing implementations and then perform comparison. In a case that it is determined through comparison that the multimedia information obtained based on one of the two implementations is the same as that obtained based on the other, the obtained multimedia information is used as multimedia information of a to-be-obtained bullet comment. In a case that it is determined through comparison that the multimedia information obtained based on one of the two implementations is different from that obtained based on the other, multimedia information obtained based on the first one of the two implementations may be used as multimedia information of a to-be-obtained bullet comment. Certainly, the first client may transmit both the at least two pieces of obtained multimedia information to the bullet comment information server, and the bullet comment information server obtains bullet comment information of a multimedia resource based on the at least two pieces of multimedia information. In this way, bullet comment information can be partially obtained based on any type of the multimedia information, thereby minimizing the possibility of a missing bullet comment due to inconsistent multimedia information names, inconsistent formats or the like.

Second, in response to receiving the multimedia information, the first client may obtain multimedia information indicating a multimedia resource name and obtain multimedia information such as multimedia playback duration, a multimedia playback progress, and a website URL.

203. The first client transmits a bullet comment obtaining request to the bullet comment information server, the bullet comment obtaining request carrying the multimedia information.

Certainly, the multimedia information may further include multimedia resource playback progress information, configured for determining which part of the multimedia resource of which corresponding bullet comment information is to be obtained, to reduce an amount of data to be transmitted between the terminal and the server.

204. The bullet comment information server converts the multimedia information to obtain multimedia identification information of the currently played multimedia resource in response to receiving the bullet comment obtaining request.

The multimedia identification information is information configured for uniquely identifying a multimedia resource on the bullet comment information server, and may be used as a search index of the bullet comment information server. That is, one multimedia identification information may uniquely correspond to bullet comment information of one multimedia resource. As a server for collecting and providing bullet comment information, the bullet comment information server may provide services to a plurality of different multimedia resource platforms. In addition, naming manners, encoding rules, and the like for multimedia resources may all be different on the multimedia resource platforms. Therefore, to avoid an error in providing bullet comment information, the multimedia information needs to be converted according to a naming rule or an encoding rule on a multimedia resource platform to obtain multimedia identification information.

For inconsistent naming rules, encoding rules, and the like, the following conversion process may be used: obtaining, by the bullet comment information server, a conversion rule corresponding to a platform identifier carried in the bullet comment obtaining request according to the platform identifier, and converting the multimedia information based on the conversion rule to obtain the multimedia identification information of the currently played multimedia resource.

Certainly, a multimedia resource may have a plurality of names. For example, a film may have an English name and a translation name. In addition, one English name may have a plurality of different translation names. Therefore, a multimedia information database may be maintained, and the multimedia information database may store a plurality of possible names of one multimedia resource and multimedia identification information corresponding to the multimedia resource on the bullet comment information server, so that the received multimedia information is used to search the multimedia information database to determine the corresponding multimedia identification information of the multimedia resource on the bullet comment information server. The multimedia identification information may be a name of the multimedia resource, an index of the multimedia resource or other information that may be configured for uniquely identifying the multimedia resource on the bullet comment information server. For example, for a film name Guardians of the Galaxy, the film name may be used to perform a search to obtain that multimedia identification information corresponding to the film name on the bullet comment information server is Guardians of the Galaxy. Certainly, the multimedia information database may further store a conversion rule of multimedia information. The conversion rule may be configured for converting the multimedia information based on encoding rules on different platforms. That is, different platforms may correspond to different conversion rules. The bullet comment information server may perform recognition on the multimedia information according to the conversion rule to determine a source platform of the multimedia information, and convert the multimedia information based on a conversion rule corresponding to the source platform. Optionally, the bullet comment obtaining request may further carry a source platform identifier, for example, a video website name, so that the bullet comment information server can directly determine a conversion rule according to the source platform identifier without recognition to facilitate corresponding conversion.

Optionally, in a case that the multimedia information further includes multimedia playback progress information, the bullet comment information server may skip conversion of the multimedia playback progress information. Instead, the bullet comment information server only extracts a multimedia name, a multimedia number or the like for conversion, to obtain multimedia identification information after the conversion.

205. The bullet comment information server obtains, according to the multimedia identification information, bullet comment information matching the multimedia identification information.

The bullet comment information server may store multimedia identification information and matching bullet comment information. Sources of the bullet comment information may be a plurality of different multimedia resource platforms or clients. The bullet comment information server may search the bullet comment information database according to the received multimedia identification information to obtain the bullet comment information matching the multimedia identification information.

In a case that the multimedia information further includes multimedia playback progress information, bullet comment information later than a progress point indicated by the multimedia playback progress information in the bullet comment information of the multimedia resource may further be obtained based on the multimedia playback progress information, to reduce an amount of data to be transmitted.

206. The bullet comment information server transmits the bullet comment information to the first client of the terminal.

207. The first client determines a playback interface of the currently played multimedia resource on a display interface of the second client, and displays the bullet comment information at a target position of the playback interface in response to receiving bullet comment information returned based on the multimedia information by the bullet comment information server.

The display interface of the second client may only include the playback interface of the multimedia resource, for example, a full-screen display mode or may include both the playback interface of the multimedia resource and a display interface of other information, for example, a display area of the multimedia information. Therefore, the first client may determine the playback interface of the currently played multimedia resource on the display interface of the second client, and display the bullet comment information on the playback interface.

Step 207 is a process in which the first client displays the bullet comment information on the playback interface of the second client. The target position may be a display position set by the user or may be a position set by the first client by default. For example, in a scenario in which the second client is a video application client, the target position may be the top of a video playback area on the playback interface. In a scenario in which the second client is a browser client, the target position may be any area on a browser interface (that is, a playback interface). Optionally, the target position may be located in the video playback area or may be not located in the video playback area.

Certainly, during the running of the first client and the second client, the user may further post bullet comment information by using the first client. Correspondingly, in response to obtaining new bullet comment information, the first client may transmit a bullet comment addition request to the bullet comment information server. The bullet comment addition request carries the new bullet comment information and the multimedia identification information of the multimedia information. In response to receiving the bullet comment addition request, the bullet comment information server correspondingly stores the new bullet comment information and the multimedia identification information of the multimedia information.

Figure 4:
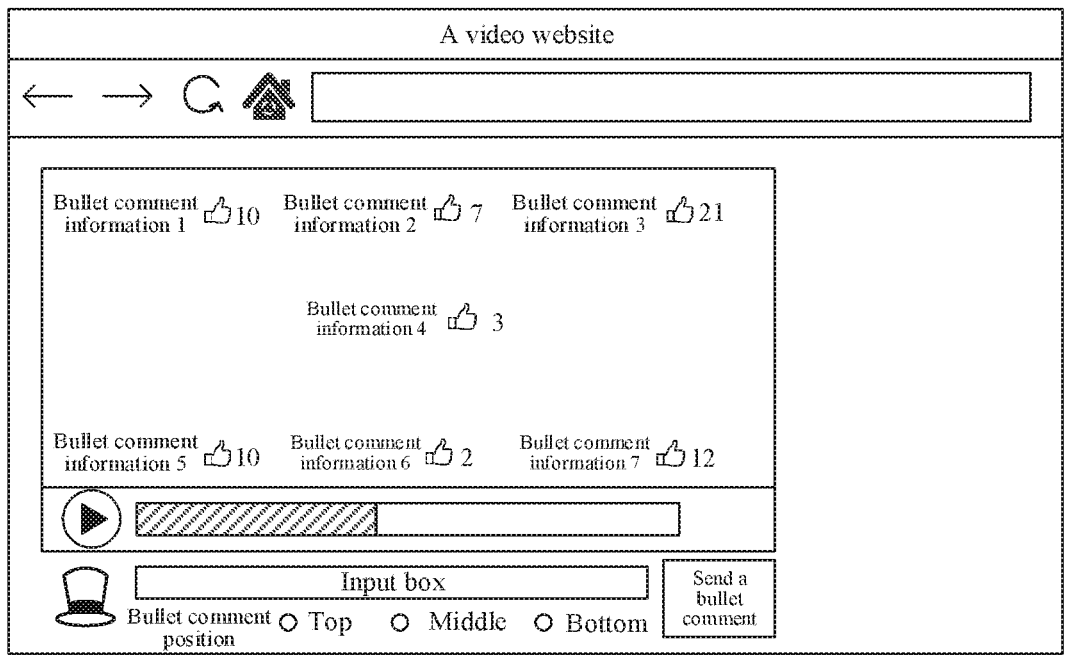
FIG. 4 is an exemplary diagram of providing a bullet comment sending interface inside a playback area of a browser client.
Figure 5:
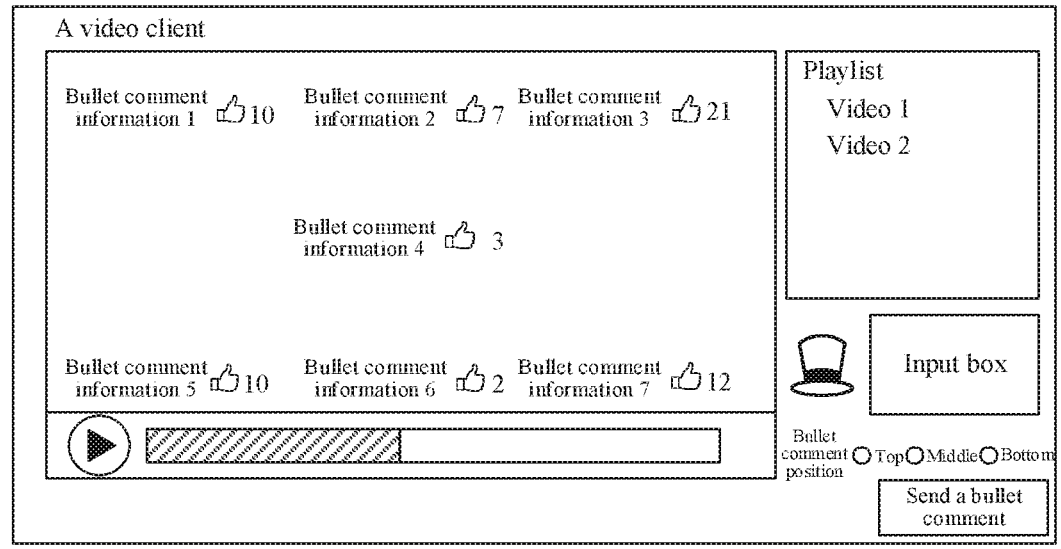
FIG. 5 is an exemplary diagram of providing a bullet comment sending interface outside a playback area of a video player.

The first client may provide a bullet comment sending interface. The bullet comment sending interface may be displayed inside a playback area of the second client in a superimposed display manner or may be displayed in an area outside the playback area of the second client. This is not specifically limited in this embodiment of the present disclosure. FIG. 4 is an exemplary diagram of providing a bullet comment sending interface inside a playback area of a browser client. The bullet comment sending interface may provide a bullet comment sending input box for a user to input bullet comment content, and further provide setting options for a bullet comment display area, so that the user may select a position at which sent bullet comment content may be displayed on the playback interface. Certainly, the user may further add bullet comment interaction information to bullet comment content through an interaction operation on displayed bullet comment content. That is, the first client may obtain bullet comment interaction information of the user for the bullet comment content, and transmit a bullet comment interaction request to the bullet comment information server. The bullet comment interaction request carries a bullet comment identifier of the bullet comment information and the bullet comment interaction information. After receiving the bullet comment interaction request, the bullet comment information server correspondingly stores the bullet comment interaction information and the bullet comment identifier. Each piece of bullet comment information may have a unique corresponding bullet comment identifier, and store bullet comment interaction information, a bullet comment sending time, a user unique identifier of a bullet comment sender, and the like corresponding to the bullet comment identifier. A specific storage form of the bullet comment information is not limited in this embodiment of the present disclosure. FIG. 5 is an exemplary diagram of providing a bullet comment sending interface outside a playback area of a video player. In this case, as shown in FIG. 5, the bullet comment sending interface is located on a side of the playback area. Certainly, a specific display position of the bullet comment sending interface may be designed according to different design requirements. This is not specifically limited in this embodiment of the present disclosure.

An embodiment of the present disclosure provides a manner of providing a bullet comment information service, so that some clients without a bullet comment information service can use a bullet comment information service in a function extension manner without a need to build a related service, thereby avoiding high development costs and meeting a launch schedule. Optionally, a bullet comment information server collects bullet comment information on different clients of different platforms, so that the clients can obtain bullet comment information from various sources, thereby greatly increasing an amount of bullet comment information. Optionally, in this embodiment of the present disclosure, a method for providing a bullet comment information service by using a first client independent of a second client is provided, thereby avoiding alternation costs for the second client. In addition, the first client may be applied to a plurality of different second clients, and an application environment of the bullet comment information is also extended, thereby achieving higher practicability. In this embodiment of the present disclosure, a method for providing a bullet comment information service by using a first client as a plug-in of a second client is provided. By means of the method, bullet comment information is obtained in real time, and the performance is more applicable to the second client.

Figure 6:
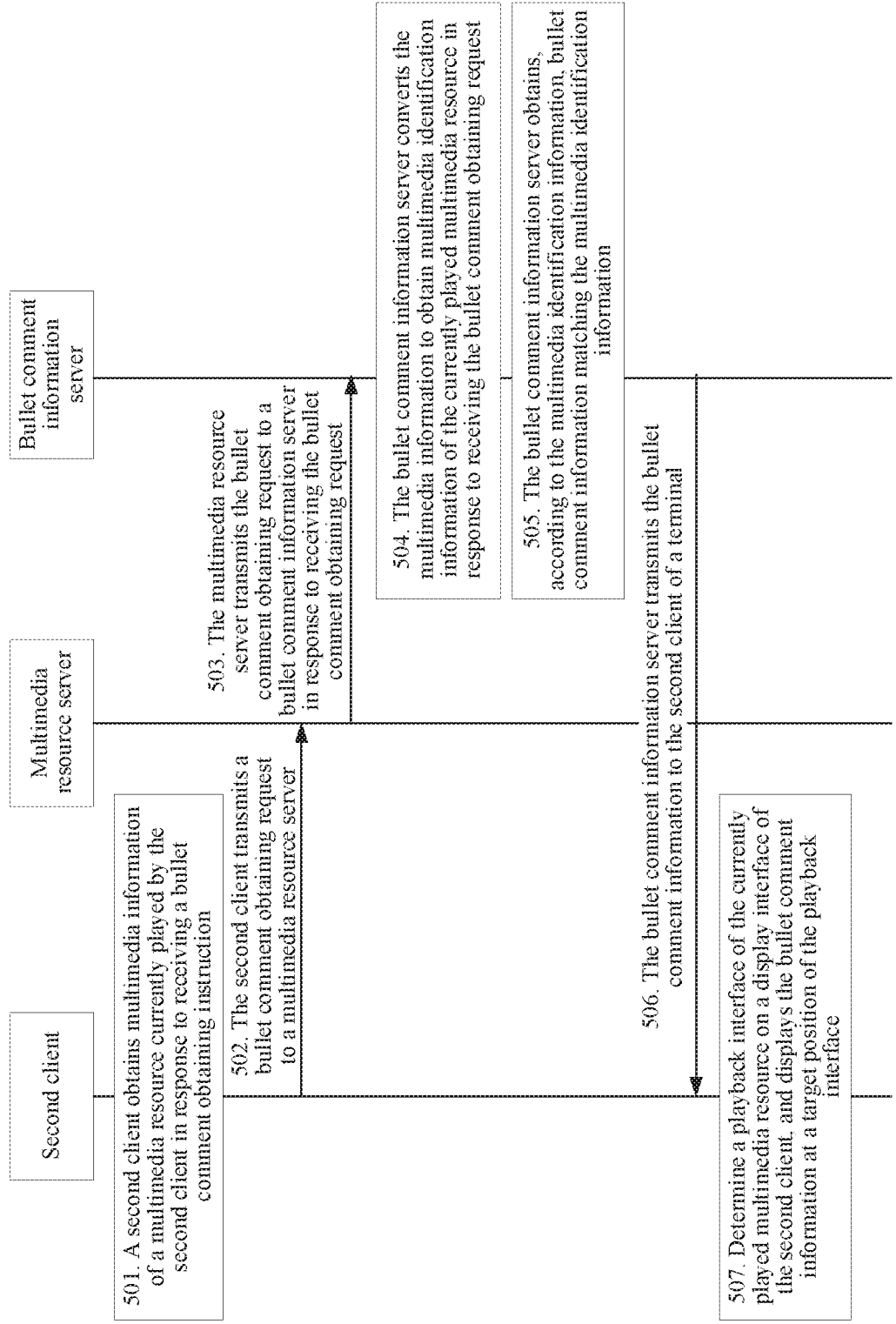
FIG. 6 is a flowchart of a method for displaying bullet comment information according to an embodiment of the present disclosure.

The foregoing steps 201 to 207 are described by using an example in which the bullet comment information server provides the second client with a bullet comment information service by using the first client. However, for some second clients, it is not necessary to install a first client on a terminal. Instead, the bullet comment information server provides the second clients with a bullet comment information service by using multimedia resource servers of the second clients. A specific implementation method in this embodiment of the present disclosure is described below by using a flowchart in FIG. 6 as an example.

501. A second client obtains multimedia information of a currently played multimedia resource in response to receiving a bullet comment obtaining instruction.

The second client may provide a bullet comment function option on a function interface of the client. In a case that a user enables the bullet comment function option on the second client, the bullet comment obtaining instruction is triggered, so that the second client receives the bullet comment obtaining instruction. Therefore, the second client may obtain the multimedia information of the currently played multimedia resource. During the obtaining, any one of the following implementations may be used. In a first implementation, the second client extracts the multimedia information from a URL currently accessed by the second client. In a second implementation, the second client may extract the multimedia information from multimedia resource data that is already stored on the second client. In a third implementation, the second client performs character recognition in a target area of a playback interface of the second client to obtain the multimedia information. A specific process is similar to the obtaining process in the foregoing step 202, and a difference of the two processes lies in that different clients performs the obtaining process. Details are not described herein again.

Certainly, a multimedia resource server may perform the obtaining process of the multimedia information. Because the user uses the second client to play a multimedia resource provided by the multimedia resource server, the multimedia resource server may determine multimedia information of a multimedia resource currently played by the second client. In an implementation, in response to determining that the second client opens a multimedia resource, the multimedia resource server may transmit multimedia information of the multimedia resource to the second client. In a case that the second client has already enabled the bullet comment function, the multimedia resource server may store bullet comment information of the multimedia resource. Therefore, the multimedia resource server may directly perform the obtaining process of the bullet comment information in step 504 and step 505, and transmit obtained bullet comment information together with the multimedia information to the second client, to display bullet comment information.

First, in a case that the second client obtains the multimedia information, one of the foregoing implementations that is to be specifically used is not limited in this embodiment of the present disclosure. Certainly, to provide more accurate multimedia information, the second client may separately obtain multimedia information based on at least two of the foregoing implementations and then perform comparison. In a case that it is determined through comparison that the multimedia information obtained based on one of the two implementations is the same as that obtained based on the other, the obtained multimedia information is used as multimedia information of a to-be-obtained bullet comment. In a case that it is determined through comparison that the multimedia information obtained based on one of the two implementations is different from that obtained based on the other, multimedia information obtained based on the first one of the two implementations may be used as multimedia information of a to-be-obtained bullet comment. Certainly, the second client may transmit both the at least two pieces of obtained multimedia information to the bullet comment information server, and the bullet comment information server obtains bullet comment information of a multimedia resource based on the at least two pieces of multimedia information. In this way, bullet comment information can be partially obtained based on any type of the multimedia information, thereby minimizing the possibility of a missing bullet comment due to inconsistent multimedia information names, inconsistent formats or the like.

Figure 7:
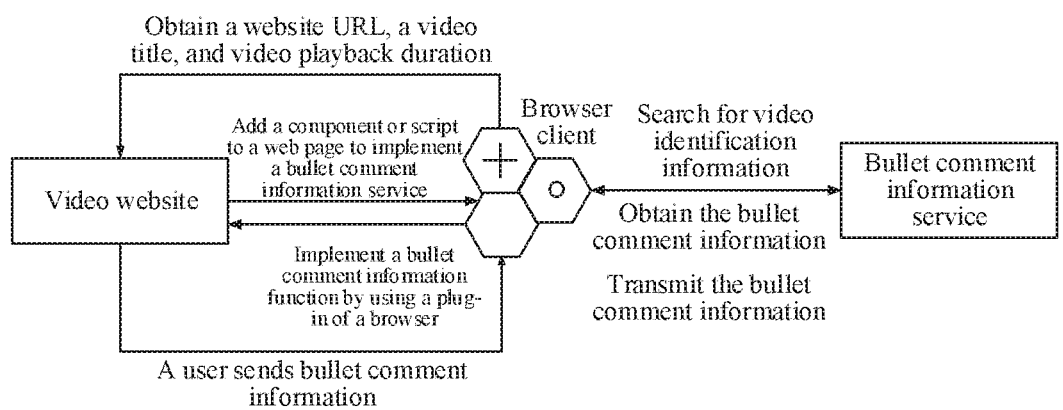
FIG. 7 is a schematic diagram of an architecture for implementing a bullet comment function.

Second, the second client may be a client provided by the multimedia resource server. Correspondingly, the bullet comment function option may be embedded into the second client and used as an option on a function interface of the second client. However, the second client may be a client that can access any multimedia resource server instead of a client provided by the multimedia resource server. In this case, the multimedia resource server may embed a component or script for implementing the bullet comment function to a web page to provide the bullet comment function. FIG. 7 is a schematic diagram of an architecture for implementing a bullet comment function according to an embodiment of the present disclosure. A browser client may interact with a bullet comment information server through function extension of the browser client, that is, in a plug-in form (the specific process may be steps 201 to 207), to implement a bullet comment function. The browser client may interact with the bullet comment information server by using a component or script that is provided by a video website, to implement a bullet comment function.

502. The second client transmits a bullet comment obtaining request to the multimedia resource server, the bullet comment obtaining request carrying the multimedia information.

The second client needs to obtain bullet comment information by using the multimedia resource server. Therefore, in step 502, the multimedia information needs to be transmitted to the multimedia resource server for forwarding.

503. The multimedia resource server transmits the bullet comment obtaining request to a bullet comment information server in response to receiving the bullet comment obtaining request.

The multimedia resource server may be provided with an API or SDK provided by the bullet comment information server, so that a bullet comment information service provided by the bullet comment information server can be used by calling the API or SDK.

In response to receiving the bullet comment obtaining request, the multimedia resource server may extract corresponding parameter information from the bullet comment obtaining request, and call the API based on the parameter information to transmit the bullet comment obtaining request. That is, format conversion is performed on the bullet comment obtaining request. That is, in this embodiment of the present disclosure, the bullet comment obtaining request received by the multimedia resource server and the bullet comment obtaining request transmitted by the multimedia resource server may be in different data formats. This is not specifically limited in this embodiment of the present disclosure.

504. The bullet comment information server converts the multimedia information to obtain multimedia identification information of the currently played multimedia resource in response to receiving the bullet comment obtaining request.

505. The bullet comment information server obtains, according to the multimedia identification information, bullet comment information matching the multimedia identification information.

506. The bullet comment information server transmits the bullet comment information to the second client of the terminal.

Based on that the bullet comment information server obtains address information of the second client of the terminal, step 506 may be that: the bullet comment information server directly transmits the bullet comment information to the second client of the terminal. Certainly, regardless of whether the bullet comment information server obtains the address information of the second client or not, the bullet comment information server may transmit the bullet comment information to the terminal via the multimedia resource server. In this case, step 506 may include: transmitting, by the bullet comment information server, the bullet comment information to the multimedia resource server; receiving, by the multimedia resource server, bullet comment information returned based on the multimedia information by the bullet comment information server, and transmitting the bullet comment information to the terminal, so that the terminal displays the bullet comment information on a playback interface of the currently played multimedia resource.

The foregoing steps 504 to 506 are similar to steps 204 to 206. Details are not described herein again.

507. The second client determines a playback interface of the currently played multimedia resource on a display interface of the second client, and displays the bullet comment information at a target position of the playback interface in response to receiving bullet comment information returned based on the multimedia information by the bullet comment information server.

Step 507 is a process in which the second client displays the bullet comment information on the playback interface of the second client. The target position may be a display position set by the user or may be a position set by the second client by default. For example, in a scenario in which the second client is a video application client, the target position may be the top of a video playback area on the playback interface. In a scenario in which the second client is a browser client, the target position may be any area on a browser interface (that is, a playback interface). Optionally, the target position may be located in the video playback area or may be not located in the video playback area.

Certainly, during the running of the second client, the user may further post bullet comment information by using the second client. Correspondingly, in response to obtaining new bullet comment information, the second client may transmit a bullet comment addition request to the bullet comment information server. The bullet comment addition request carries the new bullet comment information and the multimedia information. In response to receiving the bullet comment addition request, the bullet comment information server converts the multimedia information, obtains multimedia identification information of the multimedia information, and correspondingly stores the new bullet comment information and the multimedia identification information of the multimedia information.

The second client may provide a bullet comment sending interface. The bullet comment sending interface may be displayed inside a playback area of the second client in a superimposed display manner (for example, as shown in FIG. 4) or may be displayed in an area outside the playback area of the second client (for example, as shown in FIG. 5). This is not specifically limited in this embodiment of the present disclosure. Certainly, the user may further add bullet comment interaction information to bullet comment content through an interaction operation on displayed bullet comment content. That is, the second client may obtain bullet comment interaction information of the user for the bullet comment content, and transmit a bullet comment interaction request to the bullet comment information server. The bullet comment interaction request carries a bullet comment identifier of the bullet comment information and the bullet comment interaction information. After receiving the bullet comment interaction request, the server correspondingly stores the bullet comment interaction information and the bullet comment identifier. Each piece of bullet comment information may have a unique corresponding bullet comment identifier, and store bullet comment interaction information, a bullet comment sending time, a user unique identifier of a bullet comment sender, and the like corresponding to the bullet comment identifier. A specific storage form of the bullet comment information is not limited in this embodiment of the present disclosure.

An embodiment of the present disclosure provides a manner of providing a bullet comment information service, so that some clients without a bullet comment information service can use a bullet comment information service in a function extension manner without a need to build a related service, thereby avoiding high development costs and meeting a launch schedule. Further, a bullet comment information server collects bullet comment information on different clients of different platforms, so that the clients can obtain bullet comment information from various sources, thereby greatly increasing an amount of bullet comment information. Furthermore, the multimedia resource server is used as a forwarding server between a client and the bullet comment information server, thereby extending functions of the multimedia resource server.

Figure 8:
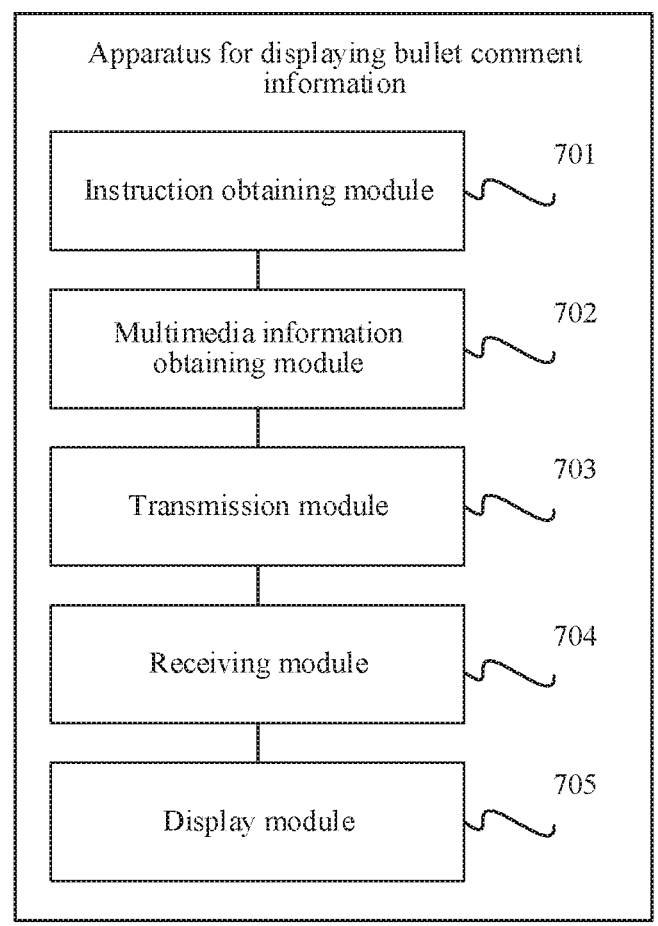
FIG. 8 is a schematic structural diagram of an apparatus for displaying bullet comment information according to an embodiment of the present disclosure.

FIG. 8 is a schematic structural diagram of an apparatus for displaying bullet comment information according to an embodiment of the present disclosure. The apparatus for displaying bullet comment information is applied to a first client. The first client is served by a bullet comment information server. The apparatus includes:

an instruction obtaining module 701, configured to obtain a bullet comment service instruction, the bullet comment service instruction being configured for obtaining a bullet comment function provided by the bullet comment information server;

a multimedia information obtaining module 702, configured to obtain multimedia information of a multimedia resource currently played by a second client;

a transmission module 703, configured to transmit a bullet comment obtaining request to the bullet comment information server, the bullet comment obtaining request carrying the multimedia information;

a receiving module 704, configured to receive bullet comment information returned based on the multimedia information by the bullet comment information server; and a display module 705, configured to display the bullet comment information on a playback interface of the second client.

In a possible implementation, the multimedia information obtaining module 702 is configured to:

extract the multimedia information from a URL currently accessed by the second client; or extract the multimedia information from multimedia resource data that is already stored on the second client; or perform character recognition in a target area of the playback interface of the second client to obtain the multimedia information.

In a possible implementation, the multimedia information obtaining module 702 is configured to: traverse multimedia resource data that is already stored on the second client, and extract data corresponding to a target label as the multimedia information in a case that the target label is reached.

In a possible implementation, the display module 705 is configured to: determine a playback interface of the currently played multimedia resource on the display interface of the second client, and display the bullet comment information at a target position of the playback interface.

In a possible implementation, the display module 705 is further configured to display a bullet comment function login interface:

the transmission module 703 is further configured to transmit user information obtained based on the bullet comment function login interface to the bullet comment information server; and the multimedia information obtaining module 702 is configured to: after the bullet comment information server is verified, perform the operation of obtaining multimedia information of a multimedia resource currently played by a second client.

In a possible implementation, the apparatus further includes:

a setting module, configured to: provide a bullet comment display setting box, and set a bullet comment display manner according to display parameters obtained based on the bullet comment display setting box.

In a possible implementation, the first client and the second client are different clients, or, the first client is a plug-in of the second client.

In a possible implementation, the bullet comment information at least includes bullet comment content, and further includes one or a combination of several of a user unique identifier of a bullet comment sender, a bullet comment sending time, and bullet comment interaction information.

In a case that the apparatus for displaying bullet comment information provided by the foregoing embodiment displays bullet comment information, the division of the functional modules is only used as an example for description. In actual applications, the functions may be allocated to and completed by different functional modules as required. That is, the internal structure of the device is divided into different functional modules to complete all or some of the above described functions. In addition, the apparatus for displaying bullet comment information provided by the foregoing embodiment belongs to the same concept as the embodiment of the method for displaying bullet comment information. For the specific implementation process, refer to the method embodiments, and the details are not described herein again.

Figure 9:
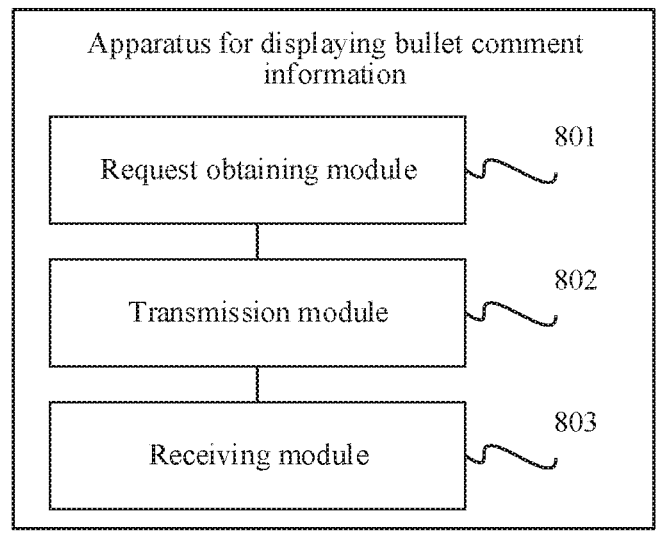
FIG. 9 is a schematic structural diagram of an apparatus for displaying bullet comment information according to an embodiment of the present disclosure.

FIG. 9 is a schematic structural diagram of an apparatus for displaying bullet comment information according to an embodiment of the present disclosure. The apparatus is applied to a multimedia resource server. Referring to FIG. 9, the apparatus includes:

a request obtaining module 801, configured to obtain a bullet comment obtaining request from a terminal, the bullet comment obtaining request carrying multimedia information of a multimedia resource currently played by the terminal;

a transmission module 802, configured to transmit the bullet comment obtaining request to a bullet comment information server; and a receiving module 803, configured to: receive bullet comment information returned based on the multimedia information by the bullet comment information server, and transmit the bullet comment information to the terminal, the terminal displaying the bullet comment information on a playback interface of the currently played multimedia resource.

In a possible implementation, the apparatus is implemented by using an API or SDK provided by the bullet comment information server.

In a case that the apparatus for displaying bullet comment information provided by the foregoing embodiment displays bullet comment information, the division of the functional modules is only used as an example for description. In actual applications, the functions may be allocated to and completed by different functional modules as required. That is, the internal structure of the device is divided into different functional modules to complete all or some of the above described functions. In addition, the apparatus for displaying bullet comment information provided by the foregoing embodiment belongs to the same concept as the embodiment of the method for displaying bullet comment information. For the specific implementation process, refer to the method embodiments, and the details are not described herein again.

Figure 10:
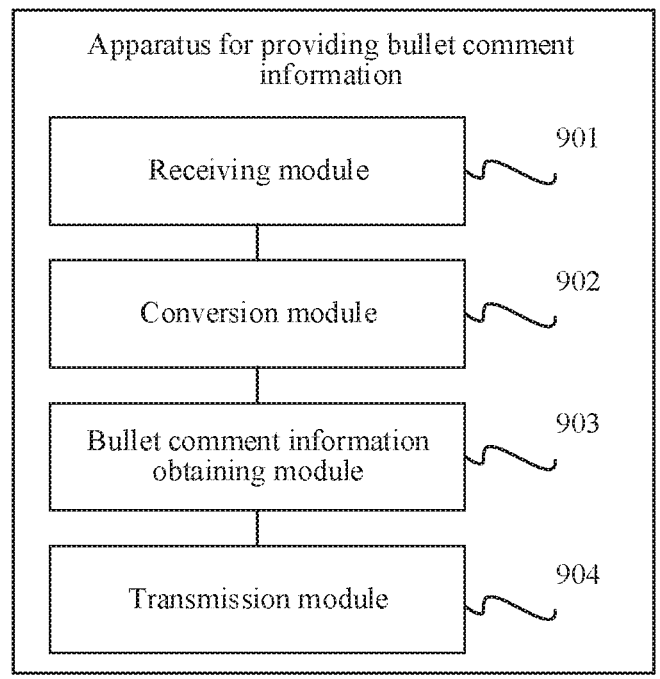
FIG. 10 is a schematic structural diagram of an apparatus for providing bullet comment information according to an embodiment of the present disclosure.

FIG. 10 is a schematic structural diagram of an apparatus for providing bullet comment information according to an embodiment of the present disclosure. The apparatus is applied to a bullet comment information server and includes:

a receiving module 901, configured to receive a bullet comment obtaining request, the bullet comment obtaining request carrying multimedia information of a multimedia resource currently played by a terminal;

a conversion module 902, configured to convert the multimedia information to obtain multimedia identification information of the currently played multimedia resource;

a bullet comment information obtaining module 903, configured to obtain, according to the multimedia identification information, bullet comment information matching the multimedia identification information, and a transmission module 904, configured to transmit the bullet comment information to the terminal.

In a possible implementation, the receiving module 901 is further configured to receive user information;

the apparatus further includes: a verification module, configured to verify the user information; and the transmission module 904 is further configured to: after the verification succeeds, transmit a login token to the terminal, where the login token is configured for indicating that the terminal is in a logged-in state.

In a possible implementation, the receiving module 901 is further configured to receive a bullet comment addition request, the bullet comment addition request carries new bullet comment information and the multimedia information;

the conversion module 902 is further configured to convert the multimedia information to obtain multimedia identification information of the multimedia information; and the apparatus further includes: a first storage module, configured to correspondingly store the new bullet comment information and the multimedia identification information of the multimedia information.

In a possible implementation, the receiving module is further configured to receive a bullet comment addition request, where the bullet comment addition request carries the new bullet comment information and the multimedia identification information of the multimedia information.

The apparatus further includes: a second storage module, configured to correspondingly store the user unique identifier, the new bullet comment information, and the multimedia identification information of the multimedia information.

In a possible implementation, the receiving module is further configured to receive a bullet comment interaction request, where the bullet comment interaction request carries a bullet comment identifier and the bullet comment interaction information.

The apparatus further includes:

a third storage module, configured to correspondingly store the bullet comment interaction information and the bullet comment identifier.

In a case that the apparatus for providing bullet comment information provided by the foregoing embodiment provides bullet comment information, the division of the functional modules is only used as an example for description. In actual applications, the functions may be allocated to and completed by different functional modules as required. That is, the internal structure of the device is divided into different functional modules to complete all or some of the above described functions. In addition, the apparatus for providing bullet comment information provided by the foregoing embodiment belongs to the same concept as the embodiment of the method for providing bullet comment information. For the specific implementation process, refer to the method embodiments, and the details are not described herein again.

Figure 11:
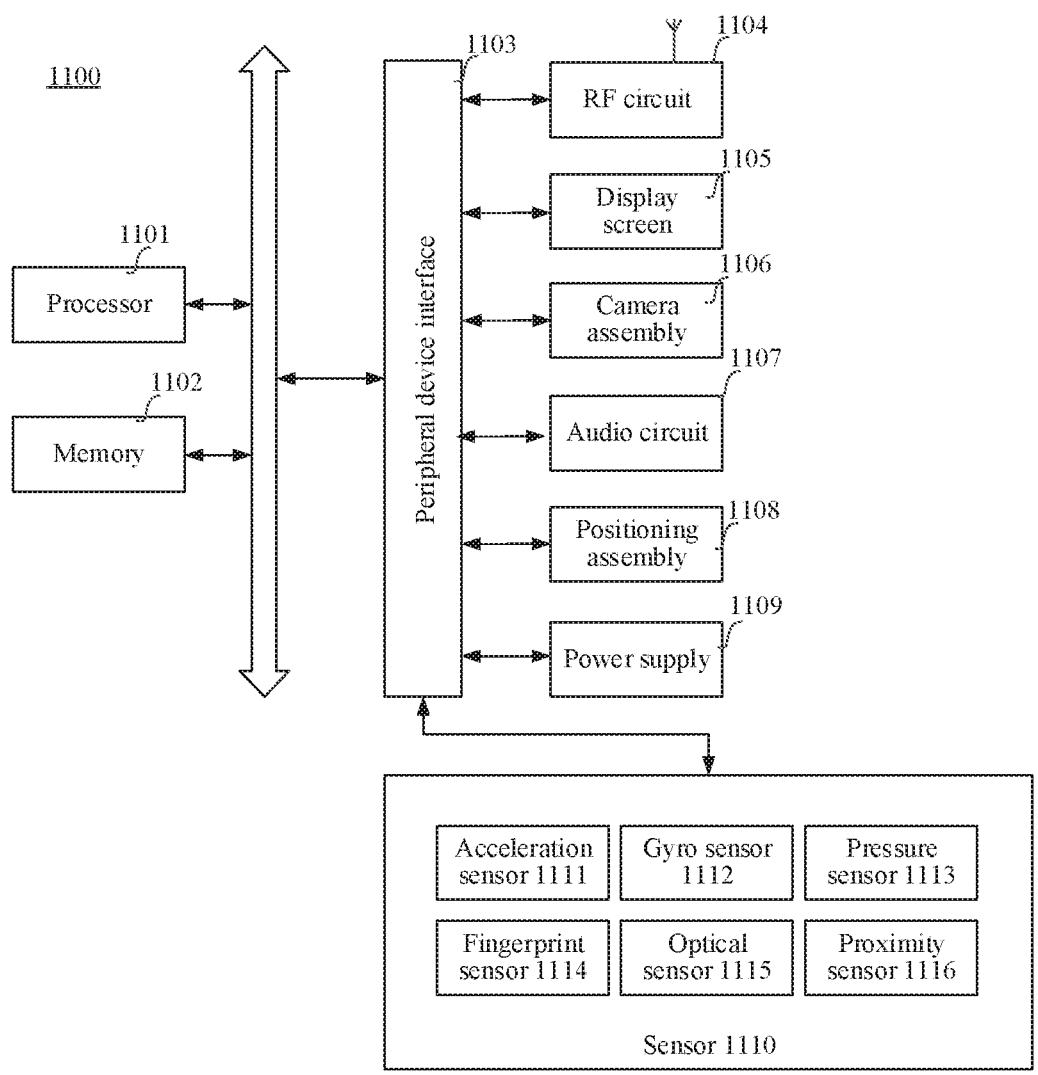
FIG. 11 is a schematic structural diagram of a terminal 1100 according to an embodiment of the present disclosure.

FIG. 11 is a schematic structural diagram of a terminal 1100 according to an embodiment of the present disclosure. The terminal 1100 may be a smartphone, a tablet computer, a Moving Picture Experts Group Audio Layer III (MP3) player, a Moving Picture Experts Group Audio Layer IV (MP4) player, a notebook computer, a desktop computer or the like. The terminal 1100 may also be referred to as another name such as user equipment, a portable terminal, a laptop terminal or a desktop terminal.

Generally, the terminal 1100 includes a processor 1101 and a memory 1102.

The processor 1101 may include one or more processing cores, for example, a 4-core processor or an 8-core processor. The processor 1101 may be implemented by using at least one hardware form of digital signal processor (DSP), a field-programmable gate array (FPGA), and a programmable logic array (PLA). The processor 1101 may also include a main processor and a coprocessor. The main processor is a processor configured to process data in a wake-up state, and is also referred to as a central processing unit (CPU). The coprocessor is a low-power processor configured to process data in a standby state. In some embodiments, the processor 1101 may integrate a graphics processing unit (GPU). The GPU is configured to render and draw content that needs to be displayed on a display screen. In some embodiments, the processor 1101 may further include an artificial intelligence (AI) processor. The AI processor is configured to process a computer operation related to machine learning.

The memory 1102 may include one or more computer-readable storage media. The computer-readable storage medium may be non-transient. The memory 1102 may further include a high-speed random access memory (RAM), and a non-volatile memory such as one or more magnetic disk storage devices or flash memory devices. In some embodiments, the non-transient computer-readable storage medium in the memory 1102 is configured to store at least one instruction, the at least one instruction is configured for being executed by the processor 1101 to implement method operations on a terminal side in the method for displaying bullet comment information provided in method embodiments of the present disclosure. The method is applied to a first client. The first client is served by a bullet comment information server. Specifically, the following method operations may be performed:

obtaining a bullet comment service instruction, the bullet comment service instruction being configured for obtaining a bullet comment function provided by the bullet comment information server:

obtaining multimedia information of a multimedia resource currently played by a second client;

transmitting a bullet comment obtaining request to the bullet comment information server, the bullet comment obtaining request carrying the multimedia information; and receiving bullet comment information returned based on the multimedia information by the bullet comment information server, and displaying the bullet comment information on a playback interface of the second client.

In a possible implementation, the processor 1101 is configured to:

extract the multimedia information from a URL currently accessed by the second client; or extract the multimedia information from multimedia resource data that is already stored on the second client; or perform character recognition in a target area of the playback interface of the second client to obtain the multimedia information.

In a possible implementation, the processor 1101 is further configured to:

display a bullet comment function login interface:

transmit user information obtained based on the bullet comment function login interface to the bullet comment information server; and perform the operation of obtaining multimedia information of a multimedia resource currently played by a second client, after the bullet comment information server is verified.

In a possible implementation, the first client and the second client are different clients, or, the first client is a plug-in of the second client.

In some embodiments, the terminal 1100 may further optionally include: a peripheral device interface 1103 and at least one peripheral device. The processor 1101 and the memory 1102 may be connected to the peripheral device interface 1103 by a bus or a signal cable. The peripheral device may be connected to the peripheral device interface 1103 by a bus, a signal cable or a circuit board. Specifically, the peripheral device may include at least one of a radio frequency (RF) circuit 1104, a touch display screen 1105, a camera assembly 1106, an audio circuit 1107, a positioning assembly 1108, and a power supply 1109.

The peripheral device interface 1103 may be configured to connect at least one peripheral device related to input/output (I/O) to the processor 1101 and the memory 1102. In some embodiments, the processor 1101, the memory 1102, and the peripheral device interface 1103 are integrated on the same chip or circuit board. In some other embodiments, any one or any two of the processors 1101, the memory 1102, and the peripheral device interface 1103 may be implemented on a single chip or circuit board. This is not limited in this embodiment.

The RF circuit 1104 is configured to receive and transmit an RF signal, which is also referred to as an electromagnetic signal. The RF circuit 1104 communicates with a communications network or with another communications device by using an electromagnetic signal. The RF circuit 1104 converts an electrical signal into an electromagnetic signal for transmission, or, converts a received electromagnetic signal into an electrical signal. Optionally, the RF circuit 1104 includes an antenna system, an RF transceiver, one or more amplifiers, a tuner, an oscillator, a DSP, a codec chip set, a subscriber identity module (SIM) card, and the like. The RF circuit 1104 may communicate with another terminal by using at least one wireless communications protocol. The wireless communications protocol includes, but is not limited to, a metropolitan area network, different generations (2G, 3G, 4G, and 5G) of mobile communication networks, a wireless local area network (WLAN) and/or a wireless fidelity (Wi-Fi) network. In some embodiments, the RF circuit 1104 may further include a circuit related to near field communication (NFC). This is not limited in this embodiment of the present disclosure.

The display screen 1105 is configured to display a user interface (UI). The UI may include an image, a text, an icon, a video or any combination thereof. In a case that the display screen 1105 is a touch display screen, the display screen 1105 further has a capability of collecting a touch signal on or above a surface of the display screen 1105. The touch signal may be used as a control signal to be inputted into the processor 1101 for processing. In this case, the display screen 1105 may further be configured to provide a virtual button and/or a virtual keyboard, and is also referred to as a soft button and/or a soft keyboard. In some embodiments, there may be one display screen 1105, disposed on a front panel of the terminal 1100. In some other embodiments, there may be at least two display screens 1105. The at least two display screens 1105 are separately disposed on different surfaces of the terminal 1100 or are designed in a folding manner. In still some embodiments, the display screen 1105 may be a flexible display screen, disposed on a curved surface or a folded surface of the terminal 1100. Furthermore, the display screen 1105 may be disposed as a non-rectangular irregular shape, that is, a special-shaped screen. The display panel 1105 may be manufactured by using materials such as a liquid crystal display (LCD) and an organic light-emitting diode (OLED).

The camera assembly 1106 is configured to collect an image or a video. Optionally, the camera assembly 1106 includes a front-facing camera and a rear-facing camera. Generally, the front-facing camera is disposed on the front panel of the terminal, the rear-facing camera is disposed at the rear face of the terminal. In some embodiments, there are two rear-facing cameras, separately being any one of a main camera, a depth-of-field camera, a wide-angle camera, and a telephoto camera, to implement the integration of the main camera and the depth-of-field camera to implement a background blur function and the integration of the main camera and the wide-angle camera to implement a panoramic photo shooting function, a virtual reality (VR) shooting function or another integrated shooting function. In some embodiments, the camera assembly 1106 may further includes a flash. The flash may be a single color temperature flash or may be a dual color temperature flash. The dual color temperature flash is a combination of a warm light flash and a cold light flash and may be configured for light compensation at different color temperatures.

The audio circuit 1107 may include a microphone and a loudspeaker. The microphone is configured to collect sound waves from a user and in an environment, and convert the sound waves into electrical signals to be inputted into the processor 1101 for processing, or inputted into the RF circuit 1104 to implement voice communication. For a purpose of stereo collection or noise reduction, a plurality of microphones may be separately disposed at different parts of the terminal 1100. The microphone may further be an array microphone or an omnidirectional collection microphone. The loudspeaker is configured to convert an electrical signal from the processor 1101 or the RF circuit 1104 into a sound wave. The loudspeaker may be a conventional thin film loudspeaker or may be a piezoelectric ceramic loudspeaker. In a case that the loudspeaker is a piezoelectric ceramic loudspeaker, the loudspeaker may not only convert an electrical signal into a sound wave audible to humans, but also convert the electrical signal into a sound wave inaudible to humans for ranging or other uses. In some embodiments, the audio circuit 1107 may further include an earphone jack.

The positioning assembly 1108 is configured to locate a current geographical position of the terminal 1100, to implement navigation or a location-based service (LBS). The positioning assembly 1108 may be a positioning assembly based on the United States' Global Positioning System (GPS), China's BeiDou Navigation Satellite System (BDS), Russia's GLObal NAvigation Satellite System (GLONASS) or the European Union's Galileo System.

The power supply 1109 is configured to supply power to the components in the terminal 1100. The power supply 1109 may be an alternating current, a direct current, a single-use battery, or a rechargeable battery. In a case that the power supply 1109 includes a rechargeable battery, the rechargeable battery may support wired charging or wireless charging. The rechargeable battery may further be configured to support a fast charge technology.

In some embodiments, the terminal 1100 further includes one or more sensors 1110. The one or more sensors 1110 include, but are not limited to, an acceleration sensor 1111, a gyro sensor 1112, a pressure sensor 1113, a fingerprint sensor 1114, an optical sensor 1115, and a proximity sensor 1116.

The acceleration sensor 1111 may detect acceleration on three coordinate axes of a coordinate system created by using the terminal 1100. For example, the acceleration sensor 1111 may be configured to detect components of gravitational acceleration on the three coordinate axes. The processor 1101 may control, according to a gravitational acceleration signal collected by the acceleration sensor 1111, the touch display screen 1105 to display the UI in a landscape view or portrait view. The acceleration sensor 1111 may further be configured to collect motion data of a game or the user.

The gyro sensor 1112 may detect a body direction and a rotational angle of the terminal 1100, and may coordinate with the acceleration sensor 1111 to collect a 3D action of the user for the terminal 1100. According to data collected by the gyro sensor 1112, the processor 1101 may implement the following functions: motion sensing (for example, changing the UI according to a tilt operation of the user), image stabilization during shooting, game control, and inertial navigation.

The pressure sensor 1113 may be disposed in a side frame of the terminal 1100 and/or on a lower layer of the touch display screen 1105. In a case that the pressure sensor 1113 is disposed in the side frame of the terminal 1100, a holding signal for the terminal 1100 from the user may be detected. The processor 1101 performs left and right hand recognition or a shortcut operation according to the holding signal collected by the pressure sensor 1113. In a case that the pressure sensor 1113 is disposed on the lower layer of the touch display screen 1105, the processor 1101 implements, according to a pressure operation of the user for the touch display screen 1105, control of an operational control on the UI. The operational control includes at least one of a button control, a scroll-bar control, an icon control, and a menu control.

The fingerprint sensor 1114 is configured to collect fingerprints of the user. The processor 1101 recognizes an identity of the user according to the fingerprints collected by the fingerprint sensor 1114, or, the fingerprint sensor 1114 recognizes an identity of the user according to the collected fingerprints. In a case that the identity of the user is recognized as a trusted identity, the processor 1101 authorizes the user to perform a related sensitive operation. The sensitive operation includes unlocking a screen, viewing encrypted information, downloading software, making a payment, changing settings, and the like. The fingerprint sensor 1114 may be disposed on a front face, a rear face or a side face of the terminal 1100. In a case that the terminal 1100 is provided with a physical button or a manufacturer logo, the fingerprint sensor 1114 may be integrated with the physical button or the manufacturer logo.

The optical sensor 1115 is configured to collect ambient light intensity. In an embodiment, the processor 1101 may control display brightness of the touch display screen 1105 according to the ambient light intensity collected by the optical sensor 1115. Specifically, in a case that the ambient light intensity is relatively high, the display brightness of the touch display screen 1105 is adjusted to be higher. In a case that the ambient light intensity is relatively low, the display brightness of the touch display screen 1105 is adjusted to be lower. In another embodiment, the processor 1101 may further dynamically adjust shooting parameters of the camera assembly 1106 according to the ambient light intensity collected by the optical sensor 1115.

The proximity sensor 1116 is also referred to as a distance sensor, and is generally disposed on the front panel of the terminal 1100. The proximity sensor 1116 is configured to collect a distance between the user and the front face of the terminal 1100. In an embodiment, in a case that the proximity sensor 1116 detects that the distance between the user and the front face of the terminal 1100 gradually decreases, the processor 1101 controls the touch display screen 1105 to switch from a screen-on state to a screen-off state. In a case that the proximity sensor 1116 detects that the distance between the user and the front face of the terminal 1100 gradually increases, the processor 1101 controls the touch display screen 1105 to switch from a screen-off state to a screen-on state.

Persons skilled in the art may understand that the structure shown in FIG. 11 constitutes no limitation to the terminal 1100, and the terminal 1100 may include more or fewer components than those shown in the figure, or some components may be combined, or a different component deployment may be used.

Figure 12:
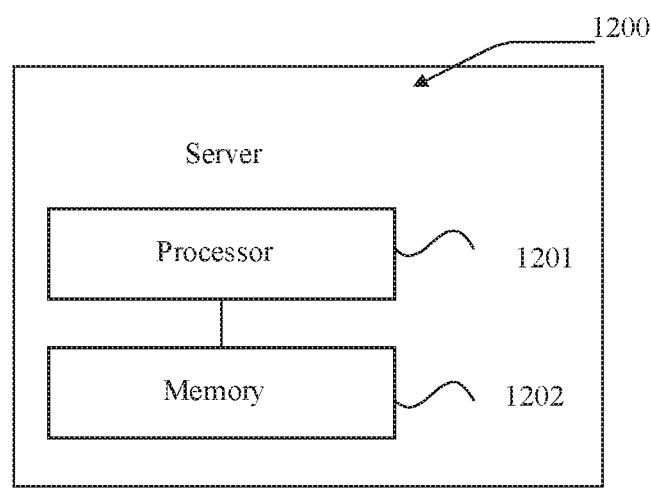
FIG. 12 is a schematic structural diagram of a server 1200 according to an embodiment of the present disclosure.

FIG. 12 is a schematic structural diagram of a server 1200 according to an embodiment of the present disclosure. The server 1200 may vary greatly due to different configurations or performance, and may include one or more processors (CPU) 1201 and one or more memories 1202. The memory 1202 stores at least one instruction.

In a possible implementation, the at least one instruction is loaded and executed by the processor 1201 to implement the following method operations on a server side in the method for displaying bullet comment information provided in the foregoing method embodiments:

obtaining a bullet comment obtaining request from a terminal, the bullet comment obtaining request carrying multimedia information of a multimedia resource currently played by the terminal:

transmitting the bullet comment obtaining request to a bullet comment information server; and receiving bullet comment information returned based on the multimedia information by the bullet comment information server, and transmitting the bullet comment information to the terminal, the terminal displaying the bullet comment information on a playback interface of the currently played multimedia resource.

In another possible implementation, the at least one instruction is loaded and executed by the processor 1201 to implement the following method operations on a server side in the method for providing bullet comment information provided in the foregoing method embodiments:

receiving a bullet comment obtaining request, the bullet comment obtaining request carrying multimedia information of a multimedia resource currently played by a terminal;

converting the multimedia information to obtain multimedia identification information of the currently played multimedia resource;

obtaining, according to the multimedia identification information, bullet comment information matching the multimedia identification information; and transmitting the bullet comment information to the terminal.

Certainly, the server may further include components such as a wired or wireless network interface, a keyboard, and an I/O interface, to facilitate I/O. The server may further include another component configured to implement functions of a device, and details are not described herein again.

An embodiment of the present disclosure further provides a computer-readable storage medium, storing a computer program, the computer program, when being executed by a processor, implementing operations of the method for displaying bullet comment information and method for providing bullet comment information in any one of the foregoing possible implementations.

A person of ordinary skill in the art may understand that all or some of steps of the embodiments may be implemented by hardware or a program instructing related hardware. The program may be stored in a computer-readable storage medium. The storage medium may be a read-only memory (ROM), a magnetic disk or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method for displaying bullet comment information performed at a terminal having one or more processors and memory storing a plurality of programs to be executed by the one or more processors, and the method comprising:
receiving a multimedia resource from a multimedia resource server and playing the multimedia resource using a second client running at the terminal that does not provide bullet comment information;
obtaining, via a first client running at the terminal, a bullet comment service instruction from a user of the terminal, the bullet comment service instruction being configured for obtaining a bullet comment function in connection with the multimedia resource currently played by the second client;
in response to the bullet comment service instruction:
obtaining multimedia information of the multimedia resource currently played by the second client;
transmitting a bullet comment obtaining request to a bullet comment information server, the bullet comment obtaining request carrying the multimedia information;
receiving bullet comment information returned by the bullet comment information server based on the multimedia information; and
overlaying the bullet comment information using the first client on a playback interface of the second client on which the multimedia resource is being played.

2. The method according to claim 1, wherein the obtaining multimedia information of the multimedia resource currently played by the second client comprises:
extracting the multimedia information from a Uniform Resource Locator (URL) currently accessed by the second client.

3. The method according to claim 1, wherein the obtaining multimedia information of the multimedia resource currently played by the second client comprises:
extracting the multimedia information from multimedia resource data that is already stored on the terminal and accessible by the second client.

4. The method according to claim 1, wherein the obtaining multimedia information of the multimedia resource currently played by the second client comprises:
performing character recognition in a target area of the playback interface of the second client to obtain the multimedia information.

5. The method according to claim 1, further comprising:
after obtaining the bullet comment service instruction:
displaying a bullet comment function login interface;
transmitting user information obtained based on the bullet comment function login interface to the bullet comment information server; and
performing the operation of obtaining multimedia information of the multimedia resource currently played by the second client after the bullet comment information server is verified.

6. The method according to claim 1, wherein the first client and the second client are different clients, or, the first client is a plug-in of the second client.

7. A terminal comprising one or more processors, memory coupled to the one or more processors and a plurality of programs stored in the memory that, when executed by the one or more processors, cause the terminal to perform a plurality of operations comprising:
receiving a multimedia resource from a multimedia resource server and playing the multimedia resource using a second client running at the terminal that does not provide bullet comment information;
obtaining, via a first client running at the terminal, a bullet comment service instruction from a user of the terminal, the bullet comment service instruction being configured for obtaining a bullet comment function in connection with the multimedia resource currently played by the second client;
in response to the bullet comment service instruction:
obtaining multimedia information of the multimedia resource currently played by the second client;
transmitting a bullet comment obtaining request to a bullet comment information server, the bullet comment obtaining request carrying the multimedia information;
receiving bullet comment information returned by the bullet comment information server based on the multimedia information; and
overlaying the bullet comment information using the first client on a playback interface of the second client on which the multimedia resource is being played.

8. The terminal according to claim 7, wherein the obtaining multimedia information of the multimedia resource currently played by the second client comprises:
extracting the multimedia information from a Uniform Resource Locator (URL) currently accessed by the second client.

9. The terminal according to claim 7, wherein the obtaining multimedia information of the multimedia resource currently played by the second client comprises:
 extracting the multimedia information from multimedia resource data that is already stored on the terminal and accessible by the second client.

10. The terminal according to claim 7, wherein the obtaining multimedia information of the multimedia resource currently played by the second client comprises:
 performing character recognition in a target area of the playback interface of the second client to obtain the multimedia information.

11. The terminal according to claim 7, wherein the plurality of operations further comprises:
 after obtaining the bullet comment service instruction:
  displaying a bullet comment function login interface;
  transmitting user information obtained based on the bullet comment function login interface to the bullet comment information server; and
  performing the operation of obtaining multimedia information of the multimedia resource currently played by the second client after the bullet comment information server is verified.

12. The terminal according to claim 7, wherein the first client and the second client are different clients, or, the first client is a plug-in of the second client.

13. A non-transitory computer readable storage medium storing a plurality of machine readable instructions in connection with a terminal having one or more processors, wherein the plurality of machine readable instructions, when executed by the one or more processors, cause the terminal to perform a plurality of operations including:
 receiving a multimedia resource from a multimedia resource server and playing the multimedia resource using a second client running at the terminal that does not provide bullet comment information;
 obtaining, via a first client running at the terminal, a bullet comment service instruction from a user of the terminal, the bullet comment service instruction being configured for obtaining a bullet comment function in connection with the multimedia resource currently played by the second client;
 in response to the bullet comment service instruction:
  obtaining multimedia information of the multimedia resource currently played by the second client;
  transmitting a bullet comment obtaining request to a bullet comment information server, the bullet comment obtaining request carrying the multimedia information;
  receiving bullet comment information returned by the bullet comment information server based on the multimedia information; and
  overlaying the bullet comment information using the first client on a playback interface of the second client on which the multimedia resource is being played.

14. The non-transitory computer readable storage medium according to claim 13, wherein the obtaining multimedia information of the multimedia resource currently played by the second client comprises:
 extracting the multimedia information from a Uniform Resource Locator (URL) currently accessed by the second client.

15. The non-transitory computer readable storage medium according to claim 13, wherein the obtaining multimedia information of the multimedia resource currently played by the second client comprises:
 extracting the multimedia information from multimedia resource data that is already stored on the terminal and accessible by the second client.

16. The non-transitory computer readable storage medium according to claim 13, wherein the obtaining multimedia information of the multimedia resource currently played by the second client comprises:
 performing character recognition in a target area of the playback interface of the second client to obtain the multimedia information.

17. The non-transitory computer readable storage medium according to claim 13, wherein the plurality of operations further comprises:
 after obtaining the bullet comment service instruction:
  displaying a bullet comment function login interface;
  transmitting user information obtained based on the bullet comment function login interface to the bullet comment information server; and
  performing the operation of obtaining multimedia information of the multimedia resource currently played by the second client after the bullet comment information server is verified.

18. The non-transitory computer readable storage medium according to claim 13, wherein the first client and the second client are different clients, or, the first client is a plug-in of the second client.

* * * * *